US007299050B2

(12) United States Patent
Delaney et al.

(10) Patent No.: US 7,299,050 B2
(45) Date of Patent: Nov. 20, 2007

(54) METHODS AND SYSTEMS FOR GENERATING, DISTRIBUTING, AND SCREENING COMMERCIAL CONTENT

(75) Inventors: Robert J. Delaney, Raleigh, NC (US); Todd Eichler, Wake Forest, NC (US); Gregory P. Kowis, Durham, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 7 days.

(21) Appl. No.: 10/844,149

(22) Filed: May 12, 2004

(65) Prior Publication Data

US 2004/0259553 A1    Dec. 23, 2004

Related U.S. Application Data

(60) Provisional application No. 60/469,753, filed on May 12, 2003.

(51) Int. Cl.
*H04Q 7/20* (2006.01)

(52) U.S. Cl. .................. 455/445; 455/405; 455/422.1; 455/466

(58) Field of Classification Search ................ 455/466, 455/566, 3.01, 405, 403, 445, 422.1; 713/201; 705/14
See application file for complete search history.

(56) References Cited

U.S. PATENT DOCUMENTS

| | | |
|---|---|---|
| 2002/0023164 A1 | 2/2002 | Lahr |
| 2002/0126708 A1 | 9/2002 | Skog et al. |
| 2002/0147928 A1 * | 10/2002 | Mahajan et al. ............ 713/201 |
| 2003/0027591 A1 | 2/2003 | Wall |

(Continued)

FOREIGN PATENT DOCUMENTS

WO   WO 02/39765 A1   5/2002

(Continued)

OTHER PUBLICATIONS

"Digital cellular telecommunications system (Phase 2+); Mobile Application Part (MAP) specification (3GPP TS 09.02 version 7.15.0 Release 1998)," GSM (Global System for Mobile Communications), ETSI TS 100 974, V7.15.0, pp. 1-118 (Mar. 2004).

(Continued)

*Primary Examiner*—Duc M. Nguyen
*Assistant Examiner*—Wayne Cai
(74) *Attorney, Agent, or Firm*—Jenkins, Wilson, Taylor & Hunt, P.A.

(57) ABSTRACT

Methods and systems for generating, distributing, and screening commercial content are disclosed. A commercial content generator (CCG) generates commercial content message and obtains from a push proxy agent address resolution server the network routing address of each push proxy agent that is required for distribution of the message to the target mobile subscriber audience. A push proxy agent receives a message containing commercial content and resolves a mobile subscriber identifier for each mobile subscriber who is to receive the commercial content information using subscriber information obtained from a subscriber location register, such as a visitor location register (VLR). The push proxy agent may also negotiate media format characteristics for each member of the target mobile subscriber audience and facilitate delivery of the commercial content to each member of the target mobile subscriber audience.

56 Claims, 6 Drawing Sheets

U.S. PATENT DOCUMENTS

2003/0093314 A1* 5/2003 Leung et al. .................. 705/14
2003/0096625 A1* 5/2003 Lee et al. .................... 455/466
2004/0203581 A1* 10/2004 Sharon et al. .............. 455/406

FOREIGN PATENT DOCUMENTS

| WO | WO 02/063849 A1 | 8/2002 |
| WO | WO 02/078381 A1 | 10/2002 |
| WO | WO 03/001770 A2 | 1/2003 |

OTHER PUBLICATIONS

"Push Access Protocol," Wireless Application Protocol, WAP-247-PAP-20010429.a, Version Apr. 29, 2001, pp. 1-49 (Apr. 29, 2001).

* cited by examiner

METHODS AND SYSTEMS FOR GENERATING, DISTRIBUTING, AND SCREENING COMMERCIAL CONTENT

RELATED APPLICATIONS

This application claims the benefit of U.S. Provisional Patent Application Ser. No. 60/469,753, filed May 12, 2003; the disclosure of which is incorporated herein by reference in its entirety.

TECHNICAL FIELD

The present invention relates to methods and systems for generating and distributing commercial content. More particularly, the present invention relates to methods for generating commercial content, distributing the commercial content to mobile communications network subscribers, and screening the distribution to verify that the content is from a sender authorized to deliver the commercial content.

RELATED ART

As the handheld wireless market continues to grow there will be a need to easily distribute large numbers of targeted advertisements and/or other targeted content to wireless and wireline customers. Currently no efficient mechanism that allows a few commercial content generators to reach a large target audience of telecommunications service subscribers exists. The SS7 network infrastructure that exists today is not engineered to handle commercial data, nor is it cost effective to evolve the network to do so. While rapidly growing IP transport networks have the potential to support the volume of messaging associated with large-scale commercial marketing campaigns, these networks are not currently configured to effectively move commercial data from the commercial sector to the handheld wireless market.

One proposed solution for distributing commercial messaging content involves the use of a commercial content generating (CCG) platform located at each end office in a mobile communications network. This proposed solution is illustrated in FIG. 1. In FIG. 1, commercial content generators 100 are co-located with mobile switching centers 102. Each commercial content generator 100 may be connected to its associated mobile switching center via an IP signaling link 104. Each mobile switching center 102 may have a legacy SS7 connection 106 to the SS7 network and a wireless link 108 to mobile communications devices 110.

In order to generate and send commercial content to mobile communications devices 110, commercial content generators 100 generate content and forward the content to mobile switching centers 102 in IP datagrams. Mobile switching centers 102 may then send the messages to local subscribers via base stations (not shown) and wireless links.

One problem with the commercial content generation and delivery system in FIG. 1 is that in order to deliver content to a group of subscribers located at different end offices, the same commercial content must be generated at each commercial content generator 100. This results in duplicated processing on the part of commercial content generators 100. In addition, requiring a commercial content generator 100 at each end office or mobile switching center increases the cost of deploying such a system.

Additional problems associated with delivering commercial content to groups of subscribers include determining whether such messages are authorized by the subscribers and the subscriber's service providers and ensuring that the senders are appropriately billed for the advertising "space" used for delivering the content to the subscribers. The proposed system illustrated in FIG. 1 does not address these problems. For instance, there is no need for screening or billing if each mobile service provider controls its own commercial content generator.

Accordingly, there exists a long-felt need for improved methods and systems for generating commercial content, delivering the content to groups of subscribers, and screening the distribution to ensure that the content is from an authorized sender.

DISCLOSURE OF THE INVENTION

The present invention includes improved methods and systems for delivering content to groups of subscribers associated with multiple end offices in a telecommunications network and for screening such distribution. In order to initiate delivery of commercial content, a commercial content generator (CCG) generates a commercial content message and obtains from a push proxy agent address resolution server (ARS) the network routing address of each push proxy agent that is required for distribution of the message to the target mobile subscriber audience. For example, the CCG may create a message that contains commercial content (e.g., an advertisement, a traffic report, a weather alert, an emergency notification, etc.), where the target mobile subscriber audience is all mobile subscribers in a geographic area, such as the Raleigh-Durham area of North Carolina. The CCG may query the push proxy agent address resolution server for routing address information associated with all push proxy agents that serve the Raleigh-Durham geographic area.

In one mode of operation, the push proxy address resolution query message may be routed to the push proxy agent address resolution server via a signaling system 7 (SS7) signaling router, such as a signal transfer point (STP) or signaling gateway (SG). The STP screens the query message to determine whether the querying commercial content generator is authorized to deliver commercial content to mobile subscribers in an operator's network and/or to obtain the requested push proxy agent address information. The STP may also copy the message for purposes of billing the generator and/or the recipient(s) of the commercial content. If the query message passes screening, the STP forwards the query message to the push proxy agent address resolution server. If the message fails the screening, the message may be discarded and the CCG may be notified.

The push proxy agent address resolution server receives the query message, extracts the targeted audience identifier, and resolves the targeted audience identifier into address of push proxy gateways associated with the targeted audience. In one example, the push proxy gateway address resolution server may resolve geographic targeted audience identifiers, such as "Boston, MA" to IP addresses of push proxy gateways for delivering commercial content to targeted mobile subscribers in the Boston area. Once the push proxy, address resolution resolves the address, the push proxy agent address resolution server may forward the resolved push proxy routing address information to the CCG via the STP. The CCG may then deliver the commercial content message to the appropriate push proxy agents for subsequent distribution to the targeted mobile subscriber audience. Alternatively, rather than returning the addresses to the CCG, the push proxy agent address resolution server may, upon completion of push proxy routing address resolution processing, deliver the commercial content message information directly to the appropriate push proxy agents.

When a push proxy agent receives commercial content from the CCG, the push proxy agent may determine a mobile subscriber identifier for each mobile subscriber that is to receive the commercial content information using subscriber information obtained from a visitor location register (VLR). The push proxy agent may also negotiate media format characteristics for each member of the target mobile subscriber audience and facilitate delivery of the commercial content to each member of the target mobile subscriber audience. Each of the targeted mobile subscribers' communication devices may screen incoming commercial content related messages and may either accept or refuse delivery of the commercial content. In one implementation, a mobile subscriber's communication device may automatically receive commercial content subscription or delivery acceptance settings from a provisioning system associated with a wireless communication network. Each communication device may generate a message that provides confirmation of a commercial content message, which may be used for accounting and billing purposes.

Delivery of commercial content may occur in a sessionless or a session-oriented mode of operation. In a session-oriented mode of operation, delivery of commercial content information may include the establishment of a session between a mobile subscriber and a push proxy agent. In the session, bi-directional, interactive communication may be possible with a targeted mobile subscriber. For example, a subscriber may receive an advertisement and decide to purchase the advertised goods via the established communication session. In a sessionless mode of operation, the commercial content may simply be forwarded to the targeted mobile subscriber without establishing a session with the subscriber.

Any of the methods and systems described herein may be implemented using hardware, software, firmware, or any combination thereof. Thus, the methods and systems described herein for generating and delivering commercial content to a targeted group of mobile subscribers may be implemented as a computer program product comprising computer executable instructions embodied in a computer readable medium. Exemplary computer readable media suitable for use in implementing the present invention include disk storage devices, memory devices, downloadable electrical signals, or any other medium capable of temporarily or permanently storing program instructions.

According to another aspect, the invention includes a business method by which a commercial content generator sells advertising space to businesses. The commercial content generator charges a fee to a party seeking to distribute commercial content. In return for the fee, the commercial content generator delivers commercial content to a group of subscribers using the methods and systems described herein. The fee charged by the commercial content generator may be a flat fee or may depend on the number of delivery confirmations received from the intended recipients. The billing information generated by the methods and systems described herein may be used to either bill the retail establishment or provide verification that delivery was completed.

Accordingly, it is an object of the invention to provide improved methods and system for generating and distributing commercial content to a targeted mobile subscriber audience.

It is another object of the invention to provide methods and systems for improving screening and billing methods for distributing commercial content to targeted subscribers in a communications network.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which.

DESCRIPTION OF THE INVENTION

Figure 1:
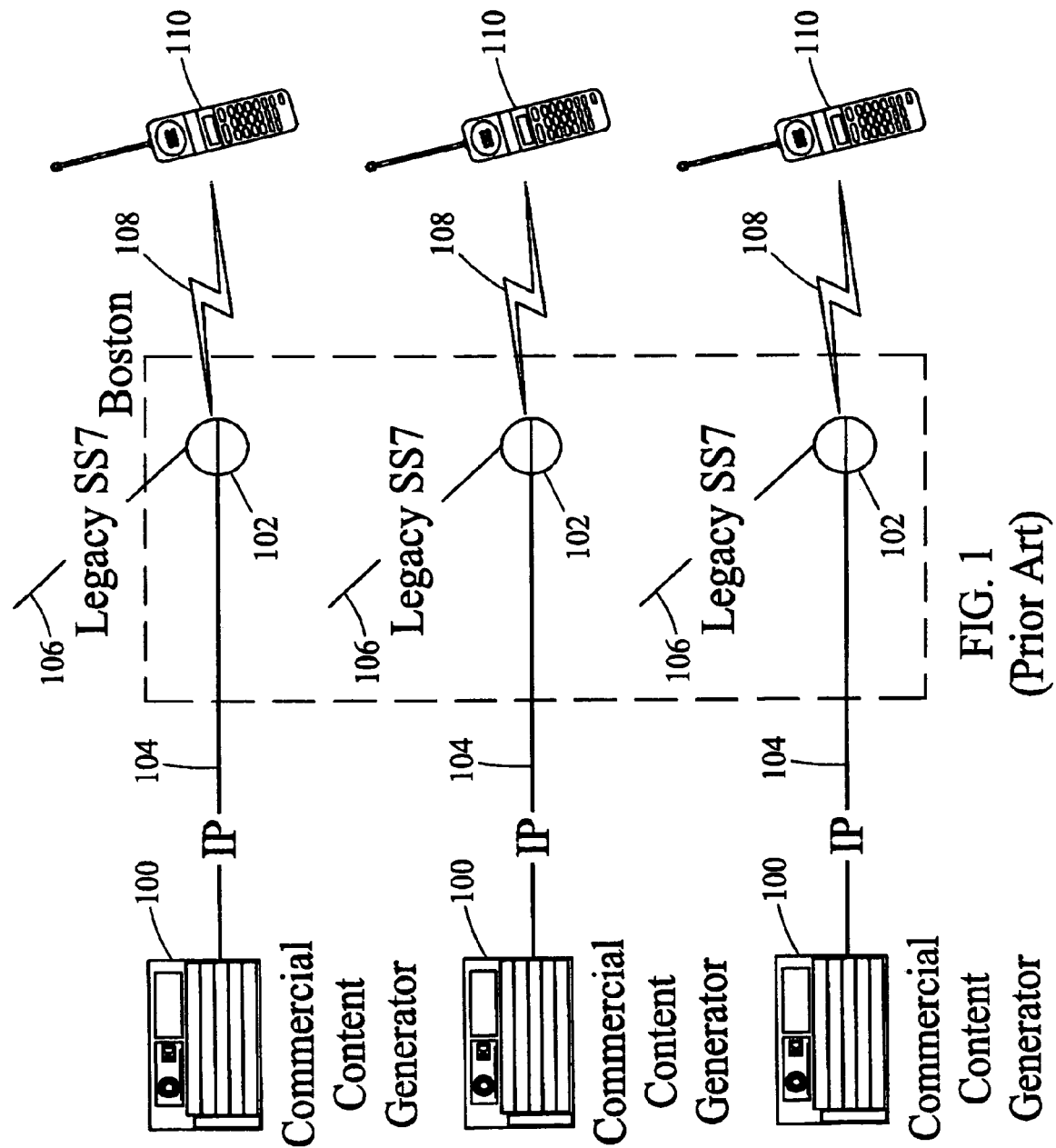
FIG. 1 is a network diagram illustrating a proposed commercial content distribution system.
Figure 2:
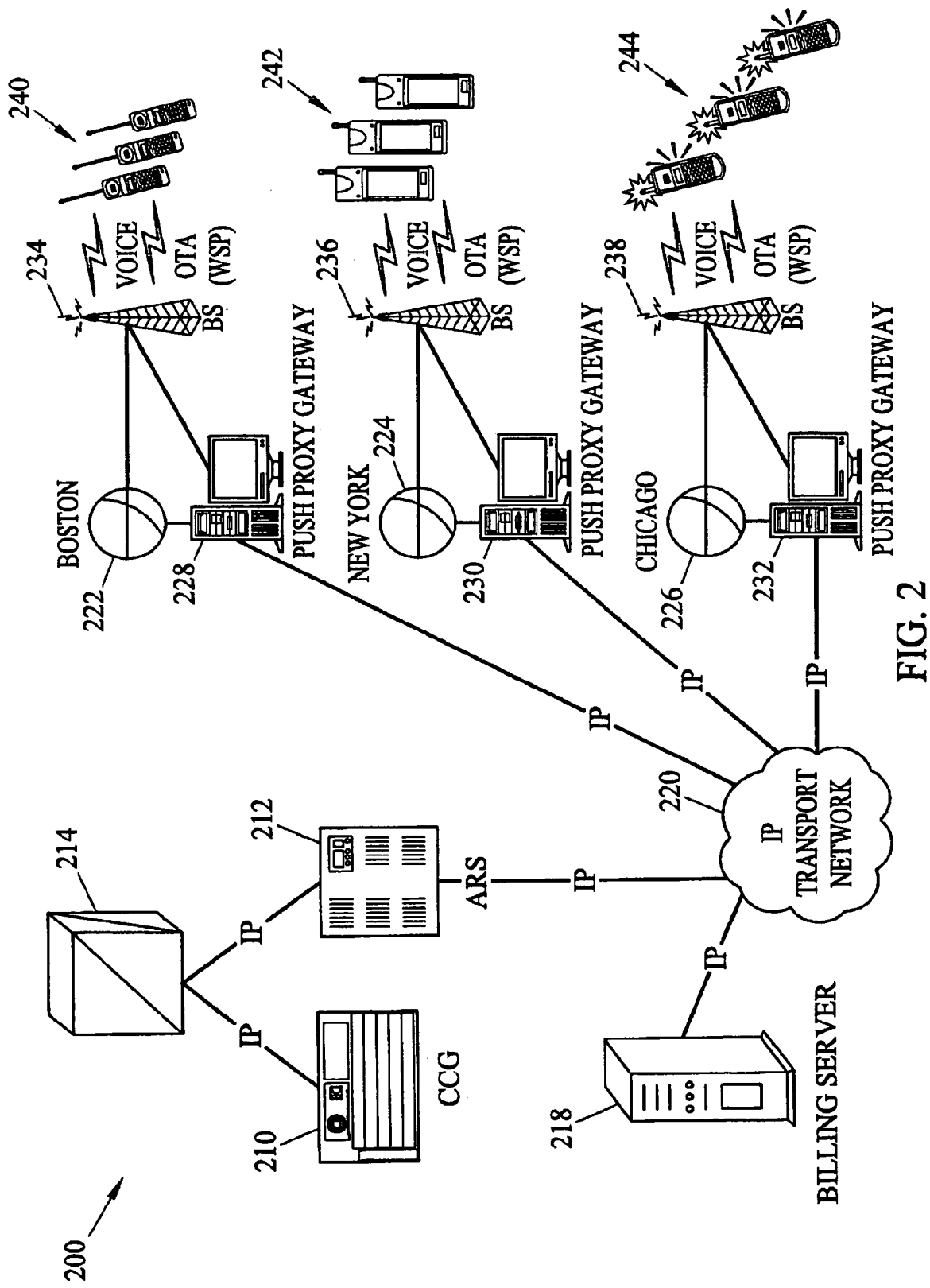
FIG. 2 is a network diagram illustrating exemplary components of a system for distributing commercial content to subscribers associated with a plurality of different mobile switching center facilities according to an embodiment of the present invention.

According to one embodiment, the present invention provides a centralized content generation and distribution system with screening and billing capabilities. FIG. 2 illustrates an exemplary network architecture 200 for a commercial content generation and distribution system according to an embodiment of the present invention. In FIG. 2, network 200 includes a commercial content generator (CCG) 210 and a push proxy gateway (PPG) address resolution server (ARS) 212, which are connected to an SS7/IP signaling gateway (SG) 214, as well as to a CCG billing server 218. The network also includes a plurality of push proxy gateways (PPGs) 228, 230, and 232 for delivering commercial content the target audience. Commercial content generator 210, address resolution server 212, billing server 218, and push proxy gateways 228, 230, and 232 may be implemented on any suitable general purpose computing platforms, such as SUN Netra™ platforms. The function of commercial content generator 210 is to generate commercial content, such as commercial text or multimedia messages to be delivered to mobile communications devices. The function of address resolution server 212 is to resolve target audience identifiers, such as geographic identifiers, into push proxy gateway addresses of intended recipients. The function of billing server 218 is to store billing information relating to the delivery of commercial content. The function of SS7/IP gateway 214 is to route messages and to screen messages initiated by CCG 210 to determine whether the sender is authorized to deliver commercial content to a group of targeted subscribers and/or obtain location information regarding the targeted subscribers. SS7/IP gateway 214 may be implemented on an STP platform, such as the Eagle® STP platform available from Tekelec of Calabasas, Calif. The function of push proxy gateways 228, 230, and 232 may be to obtain subscriber device preferences and deliver commercial content to the devices using confirmed or unconfirmed delivery mechanisms, which will be described in detail below.

In the illustrated example, CCG 210 is connected to SG 214 via an Internet protocol (IP) signaling link. In an alternate implementation, CCG 210 may be connected to SG 214 via an SS7 signaling link. As stated above, CCG 210 may be implemented using a general purpose computing platform programmed to generate commercial content based on user requests and send the content to other nodes in a predetermined commercial content distribution message format. An exemplary message format for distributing commercial content will be described in detail below.

SG 214 is connected to ARS 212 via an IP signaling link. Alternatively, SG 214 may be connected to ARS via an SS7 signaling link. Accordingly, in the illustrated, ARS element 212 may be connected to one or more PPG nodes via an IP network 220.

In the illustrated embodiment, SG 214 may function as a firewall that prevents unauthorized commercial content messages from reaching ARS 212 and subsequently reaching mobile subscribers. Exemplary screening performed by signaling gateway 214 will be described in detail below. Although in the example illustrated in FIG. 2, screening is performed by signaling gateway 214, the present invention is not limited to performing screening or firewall filtering on a signaling gateway implemented on an STP platform. Any suitable computing platform that is capable of sending and receiving messages over a network and that is programmable to perform the screening functions described herein is intended to be within the scope of the invention.

ARS 212 is coupled to Wireless Application Protocol (WAP) push proxy gateway agents, PPG 228, PPG 230, and PPG 232, via IP transport network 220. Each PPG agent 228, 230, and 232 may be a general-purpose computing platform co-located with an MSC and that is programmed to communicate with a mobile subscriber location register, such as a Visitor Location Register (VLR) in a Global System for Mobile communication (GSM), an Interim Standard 41 (IS-41) or a CDMA 2000 wireless telecommunications network, for delivering commercial content to mobile subscribers within the MSCNLR. It is common practice within such wireless telecommunication networks for VLRs to be co-located with MSCs. Accordingly, in FIG. 2, each PPG agent is shown as coupled to an MSC-VLR entity. More particularly, PPG 228 is coupled to MSC-VLR entity 222, PPG 230 is coupled to MSC-VLR entity 224, and PPG 232 is coupled to MSC-VLR entity 226. PPG agents 228, 230, and 232 are also connected to number of base stations 234, 236, and 238, respectively. Base stations 234, 236, and 238 provide the air interfaces that are used to communicate with wireless communication terminals (e.g., wireless telephone handsets, WAP terminals, personal digital assistants, mobile computing/communication devices, 802.11x user terminals, etc.). These air interfaces may employ a variety of protocols that are specifically designed to communicate voice or data (e.g., text, graphics, video, multimedia, etc.) information to and from a mobile subscriber via a radio frequency medium. MSC-VLR entities 222, 224, and 226 are also connected to base stations 234, 236, and 238, respectively, as indicated in FIG. 2. In the illustrated example, base station 234 provides service to a set of mobile subscribers 240, base station 236 provides service to a set of mobile subscribers 242, and base station 238 provides service to a set of mobile subscribers 244.

With regard to mobile subscribers of a GSM or an IS-41 telecommunications network, location and accessibility information associated each mobile subscriber in a base station service area is maintained by the VLR of the MSC-VLR entity that is supporting the base station. In addition, a single MSC-VLR entity may support multiple base stations. Thus, in order to identify which mobile subscribers are currently being served by a particular base station, a PPG agent may query the VLR of the MSC-VLR entity that is supporting the base station. The VLR may respond to the PPG agent with mobile handset address or identification information usable to communicate with some or all of the mobile subscribers being served by the base station.

In an alternate embodiment, a PPG agent may be associated with each MSC-VLR entity in a GSM or IS-41 network, instead of being associated with each base station. In other words, a single PPG agent may be associated with multiple base stations. In such an implementation, a PPG agent may query the VLR of an MSC-VLR entity that is serving mobile subscribers in a particular geographic area. In this case, the VLR may respond to the PPG agent with mobile handset address or identification information usable communicate with some or all of the mobile subscribers being served by the MSC-VLR entity.

In the embodiment illustrated in FIG. 2, ARS 212 does not resolve the routing addresses of individual mobile subscribers in a communications network. Instead, ARS 212 resolves the addresses of one or more PPG nodes that are involved in the distribution of a commercial content message to a group of targeted mobile subscribers. For example, if the operator of CCG 210 desires to send commercial content to a target audience of mobile subscribers in the Boston area, ARS 212 is capable of resolving a request for distribution in the Boston area to the routing address of PPG node 228, to which the commercial content message is subsequently routed for final distribution to those targeted mobile subscribers in the Boston area that are served by PPG node 228.

With respect to the sample embodiment shown in FIG. 2 and described above, ARS 212 enhances the overall efficiency of the commercial content message distribution process by directing commercial content messages to only those PPG elements that are associated with a group of targeted mobile subscribers. In an alternate embodiment of the present invention, ARS 212 may be integrated within CCG 210, thereby eliminating the need for a separate ARS network element. In yet another embodiment of the present invention, ARS functionality may be eliminated, and CCG 210 may simply send copies of a commercial content message to all PPGs in a network. In this case, each PPG may examine the commercial content message and determine if the message is intended for mobile subscribers served by the PPG. If the message is not intended for mobile subscribers served by the PPG, the message is ignored by the PPG. If the message is intended for mobile subscribers served by the PPG, the message is processed and delivered by the PPG in a manner similar to that described above. A PPG may include firewall screening functionality in order to prevent unauthorized commercial content messages from being distributed. This firewall screening functionality may be deployed in addition to the firewall functionality described above with respect to SG 214 and ARS 212.

WAP Messaging

PPGs 228, 230, and 232 may implement a push Over-The-Air (OTA) protocol, which is the part of the WAP push framework that is responsible for transporting content from the PPG to a WAP client and its user agents. Table 1 shown below is a WAP protocol stack that may be implemented by push proxy gateways 228, 230, and 232.

TABLE 1

WAP Protocol Stack

Services and Applications
WAP Application Layer (WAE)
WAP Session Layer (WSP)
WAP Transport Layer (WTP)
WAP Transaction Layer (WTLS)
WAP Datagram Transport Layer (WDP)
Bearers (e.g., GSM, IS-136, CDMA, PHS, CDPD, FLEX, IP)

As illustrated in Table 1, the WAP protocol stack includes a layered architecture that begins with a bearer layer responsible for encoding and decoding data to be sent over the air interface. Examples of bearer protocols that may be implemented by push proxy gateways 228, 230, and 232 include GSM, IS-136, code division multiple access (CDMA) protocols, time division multiple access (TDMA) protocols, personal handy phone system (PHS), cellular digital packet data (CDPD), FLEX, and IP over 802.11x. The next layer in the WAP protocol stack that may be implemented by PPGs 228, 230, and 232 is the wireless datagram protocol (WDP) layer. WDP is a general datagram service, offering a consistent service to the upper layer protocols and communicating transparently over one of the available underlying bearer services. This consistency is provided by a set of adaptations to specific features of these bearers. WDP provides a common interface to the upper layers that are then able to function independently of the services of the wireless network. WDP is used to hide the differences between the underlying bearer networks. The WDP is responsible for ensuring that this common service is provided over a full range of supported bearer networks. WOP provides a means for one end point to send a message point-to-point to another endpoint in the network.

The next layer in the WAP protocol stack that may be implemented by PPGs 228, 230, and 232 is the WAP Transaction Layer Security (WTLS). WTLS is designed to provide security, privacy, data integrity, and authentication between two communicating applications. It provides the upper-level layer of WAP with a secure transport service interface that preserves the transport service interface below it. In addition, WTLS provides an interface for managing (e.g., creating and terminating) secure connections and incorporates additional features, such as datagram support, optimized handshake and dynamic key refreshing. The authentication feature provided by WTLS may be used by wireless handsets to authenticate PPGs 228, 230, and 232 before accepting content from PPGs 228,230, and 232. The security feature provided by WTLS may be used by wireless handsets to engage in commercial transactions in response to commercial content received from PPGs 228, 230, and 232. For example, commercial content, such as an advertisement, may include a "buy now" option. If a mobile subscriber selects the buy now option, the mobile handset may be connected to a WTLS server that receives the mobile subscriber's shipping and payment information and completes the transaction over a secure WTLS session.

The next two layers in the WAP protocol stack that may be implemented by PPGs 228, 230, and 232 are the WAP Transaction Protocol (WTP) and the WAP Session Protocol (WSP). WTP has been defined as a lightweight transaction oriented protocol that is suitable for implementation in "thin" clients (mobile stations) and operates efficiently over wireless datagram networks. WSP provides HTTP/1.1 functionality and incorporates new features, such as long-lived sessions and session suspend/resume. WSP provides the upper-level application layer of WAP with a consistent interface for two session services. The first is a connection-mode service that operates above the transaction layer protocol, and the second is a connectionless service that operates above a secure or non-secure datagram transport service. WSP also supports the efficient operation of a WAP micro-browser running on the client device and communicating over the low-bandwidth, high-latency wireless network. Connectionless push uses the WSP S-UNIT-Push service primitives. This service need not establish a true session to communicate with the client. However, because no session is established, this mode cannot be used to fulfill a CCG request for a confirmed push. In other words, a recipient WAP client has no way to communicate whether or not it received the message. Consequently, this mode is preferably used only when CCG 210 requests an unconfirmed push. PPG nodes 228, 230, and 232 may also use the connectionless mode when PPG nodes 228, 230, and 232 do not have an open session with a target WAP client, but need to establish one.

In contrast to a connectionless push, a connection-oriented push requires an established session between the target WAP client and the serving PPG node. A connection-oriented push uses the WSP session-oriented Push primitives (S-Push, S-ConfirmedPush). PPGs 228, 230, and 232 may use this mode with the S-ConfirmedPush primitive, when CCG 210 requests a confirmed push. Depending on the control information in the commercial content message received by a PPG node, PPG may select the appropriate method of delivery. A PPG node may select an unconfirmed push, in which case the WAP client does not return a confirmation when the commercial content message is received. At the PPG, the message will be marked as successfully delivered as soon as it is sent. Alternatively, a PPG node may select a confirmed push, in which case the WAP client returns a message delivery confirmation to the PPG. The message is not considered to be delivered until an acknowledgement is received from the WAP client with a PPG specified timeout period.

Figure 4:
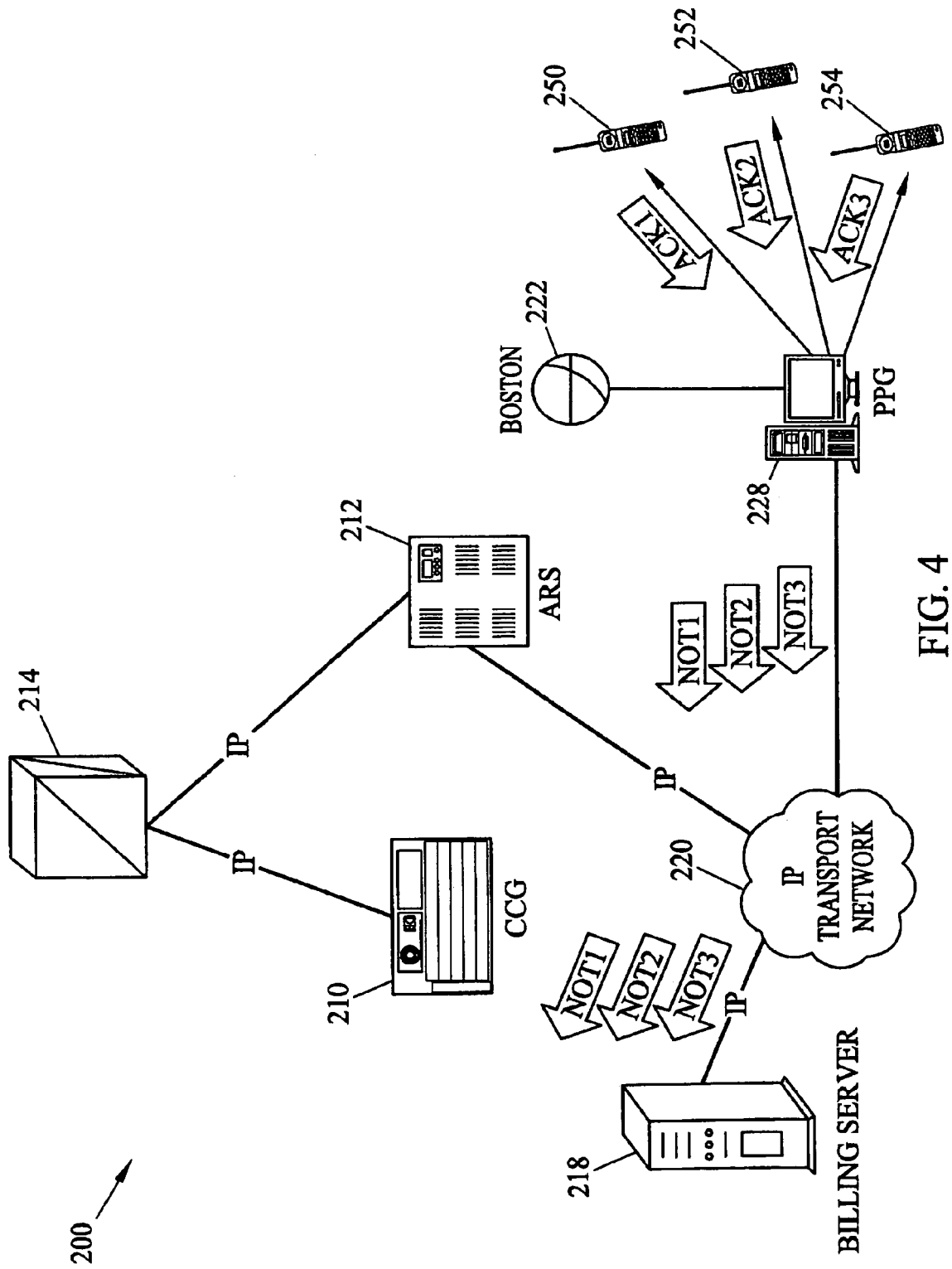
FIG. 4 is a network diagram illustrating exemplary message flows related to billing operations associated with the distribution of commercial content information to a target audience of mobile subscribers according to an embodiment of the present invention.

A result notification message may be used by PPGs 228, 230, and 232 to inform CCG 210, ARS 212, or billing server 218 of the outcome of a push submission, as generally illustrated in FIG. 4. This notification may include information which indicates that the message was sent, delivered, expired, cancelled, or encountered an error. In cases where a message was successfully delivered, notification may also include information that identifies the message recipient. For example, the notification may include the IMSI, MSISDN, MIN, email address, IP address or other identifier associated with the recipient. PPGs 228, 230, and 232 may monitor the delivery status of all commercial content messages delivered to a target subscriber audience, and once all status information has been collected, transmit a single result notification message that contains the status of all delivery attempts to CCG 210, ARS 212, or billing server 218. Alternatively, as depicted in FIG. 4, a separate result notification message associated with each delivery attempt may be transmitted by PPG 228 to CCG 210, ARS 212, or billing server 218. This notification information may be used for accounting or billing purposes. In addition, this notification message may be used to trigger delivery of related ads to subscribers have viewed or received previous ads, as will be described in detail below.

Figure 3:
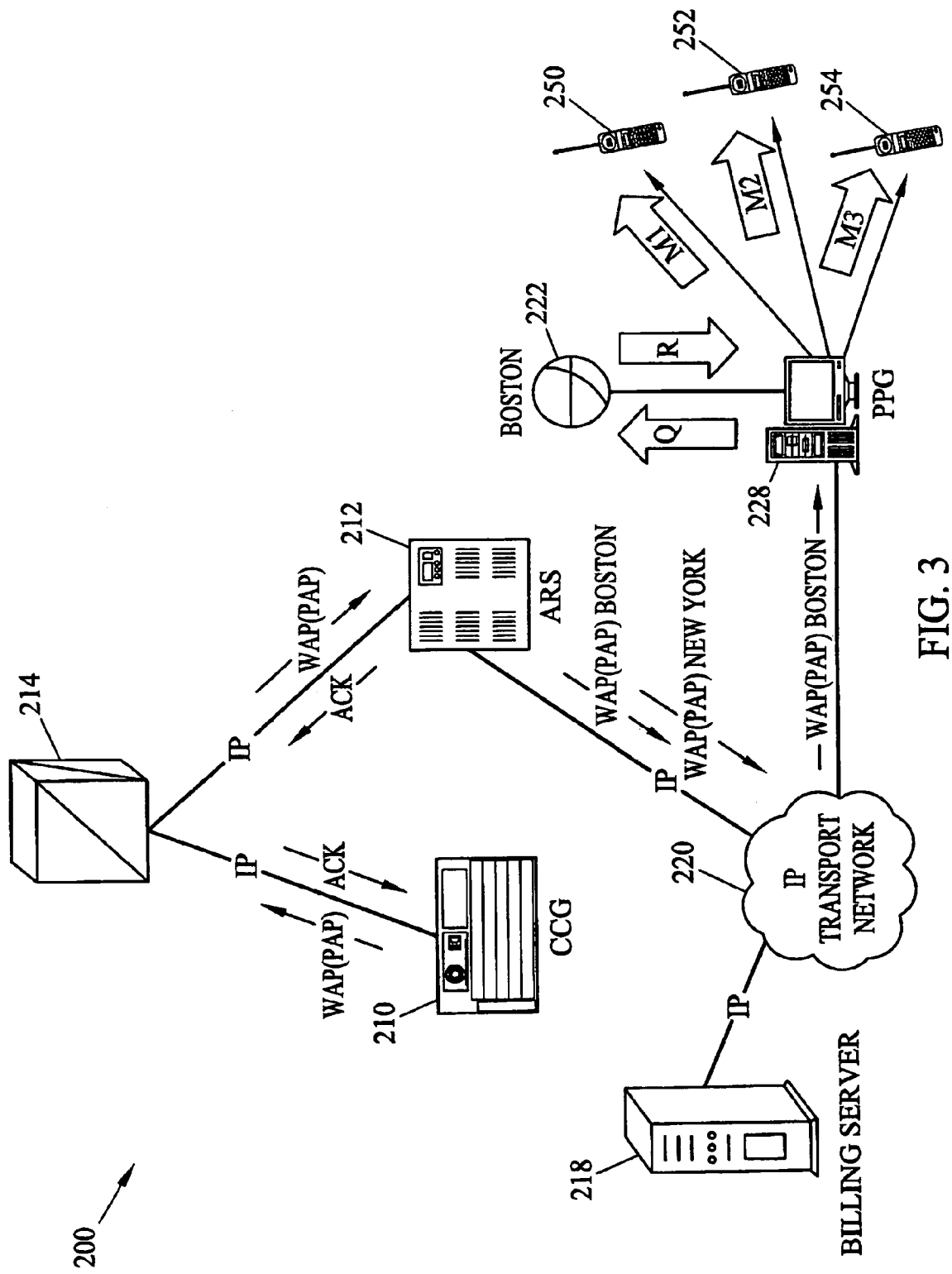
FIG. 3 is a network diagram illustrating exemplary message flows associated with the distribution of commercial content information to a target audience of mobile subscribers according to an embodiment of the present invention.

In one embodiment of the present invention, communication of commercial content information and related distribution information may be achieved through the use of the WAP protocol suite in combination with XML or other functionally similar payload data protocols. As generally illustrated in FIG. 3, a WAP push access protocol (PAP) message may be generated by CCG 210 to obtain the address of PPG 228, and another PAP message may be generated by CCG 210 or ARS 212 to deliver the commercial content to PPG 228. The first PAP message may include commercial content and information that identifies a target mobile subscriber audience (e.g., a geographic locale). The second PAP message may include a multipurpose Internet mail extension (MIME) multipart document that may carry a maximum of three types of information, each encapsulated in a separate MIME multipart entity. These three types of information may include PPG and CCG control information, the actual push message commercial content, and capabilities and preferences information, such as the preferred or supported media types of the targeted mobile device, as well as device specific characteristics such as the screen size, and support for color, if any. Such information may be obtained by the CCG from the PPGs after the PPGs have queried the VLR to obtain device preferences.

As discussed in Wireless Application Protocol WAP-247-PAP-20010429-a, Push Access Protocol version Apr. 29, 2001, published by the Wireless Application Protocol Forum, the disclosure of which is incorporated herein by reference in its entirety, the push access protocol is independent of the transport used. As such, a PAP message may be transported in IP-formatted packets over an IP communication link or may be encapsulated in a signaling system 7 (SS7) message signaling unit and transported over an SS7 signaling link. In the example shown in FIGS. 2 and 3, WAP PAP messages generated by CCG 210 are communicated to SG 214 for screening via an IP link. In a similar manner, those messages that satisfy screening criteria are transmitted to ARS 212 via an IP link.

In the present embodiment, a WAP PAP message containing commercial content (e.g., text, graphics, video, audio) information and information that broadly identifies a target mobile subscriber audience is generated by CCG 210 and is routed to ARS 212. The target mobile subscriber audience identification information included in the message sent to ARS 212 may be a geographic location identifier, a network identifier, a service provider identifier, a class of service identifier, a type of service identifier, or a combination of these identifiers. In one embodiment, such broad target mobile subscriber audience identification information may be stored in an Address Element of a WAP PAP message.

ARS element 212 may examine the target mobile subscriber audience identification information contained in a WAP PAP message, and using this information, determine to which PPG node(s) the commercial content message should be sent. Table 2 illustrates the general structure of a sample commercial content message that is communicated between CCG 210 and ARS 212 via SG 214.

TABLE 2

CCG-to-ARS Message Format

SS7 or IP header
WAP PAP message header
target audience identifier
class of service identifier
commercial content As illustrated in Table 2, the commercial content message may include an SS7 or IP header, a WAP PAP header, a target audience identifier, a class of service indicator, and commercial content information. The class of service indicator is used by a recipient communication device to determine whether a received message is to be accepted and the associated commercial content information displayed. In one business model, mobile subscribers may pay a premium to receive a higher class of service, such as a service class that results in the displaying of fewer commercial content messages. The service class indicator may also be used to determine whether certain premium service messages are received by a subscriber. For instance, a higher class of service may entitle a mobile subscriber to unlimited weather and traffic reports. In another model, a higher class of service may entitle a subscriber to "electronic" coupons that are communicated to the subscriber via a commercial content message that includes a high class of service indicator value. In general, the class of service indicator may be used to provide service discrimination among a targeted mobile subscriber audience. A message type parameter may be included within one of the headers. The message type parameter identifies the message as being one associated with commercial content distribution. This parameter may be used, for instance, by SG 214 or other firewall element for accounting, billing or security screening purposes.

With particular regard to message screening, when SG 214 receives a commercial content message from CCG 210, SG 214 preferably screens the message to determine whether to allow the message into the network. In one case, SG 214 may screen the message based on the message type and message origination or source address information contained in the message to determine whether the sender is allowed to send this type of message into the network. In more complex scenarios, SG 214 may require authentication and the establishment of a secure communications channel with CCG 210 prior to allowing any message from CCG 210 into the network. One example of a protocol that may be used for such secure communications is IP-Sec. If SG 214 allows a message into the network, SG 214 may copy the message and communicate the message copy to the billing server 218 for message accounting and/or billing purposes. Firewall screening functionality may alternatively be located at ARS 212, in which case no SG element is required.

Table 3 shown below illustrates exemplary address resolution data that may be stored by ARS element 212.

TABLE 3

PPG Address Resolution Data

| Target Audience Identifier | Serving PPG Address(es) |
| --- | --- |
| New York | 10.10.32.1; 10.10.32.2 |
| Chicago | 20.23.2.1 |
| Raleigh-Durham | 100.12.23.22 |

TABLE 3-continued

PPG Address Resolution Data

| Target Audience Identifier | Serving PPG Address(es) |
|---|---|
| MSC ID 1 | 120.56.21.2 |
| SID 12 | 104.1.1.1 |
| BID 32 | 365.56.65.5 |
| Area Code 617 | 100.100.25.67 |
| HLR ID 9193453434 | 100.123.11.2 |

In Table 3, the first column includes target subscriber audience identifiers. Such identifiers may include geographic identifiers, MSC identifiers (MSC IDs), system identifier (SIDs), billing identifiers (BIDs), an area code identifiers, and HLR identifiers. A SID is a unique identifier allocated to each geographic service area covered by a licensed wireless operator, while a BID is typically used to uniquely identify a subset or sub-region of the geographic area associated with a SID. The second column in Table 3 includes IP addresses of PPG nodes associated with each target area. Specific wireless service cell identifiers associated with a particular MSC node may also be specified as part of a target audience identifier. For example, 10.10.32.1 and 10.10.32.2 may be IP addresses of PPG nodes that serve specific areas of New York City. The network addresses of the PPG nodes may be obtained through agreements with the service providers that operate the PPG nodes in each geographic region. These addresses may be manually provisioned in a PPG address resolution database associated with ARS 212 by a network administrator.

The present invention is not limited to resolving geographic identifiers into IP addresses. Resolving any type of address identifier into the network addresses of PPG nodes (or functionally equivalent nodes) is intended to be within the scope of the invention. Once ARS 212 resolves the address, ARS 212 generates and sends commercial content messages to the resolved PPG address(es) for subsequent delivery to a target mobile subscriber audience via an over-the-air (OTA) interface.

With regard to air interface protocols, in one embodiment of the present invention, an OTA-over-WSP is employed, where OTA-over-WSP is a thin protocol layer that rides on top of WSP, and may hence be used with any bearer addressed by WAP. This protocol variant utilizes hypertext transfer protocol (HTTP) for over-the-air communication between each PPG 228, 230, or 232 and the client, and provides a connection-oriented push. Push content is delivered using the HTTP POST method, implying that each PPG 228, 230, and 232 functions as an HTTP client and the client (i.e., the mobile device) functions as an HTTP server.

VLR Query and Response

As described above with respect to FIG. 3, PPGs 228, 230, and 232 may query a VLR and obtain the information necessary to distribute a commercial content message to some or all of the mobile subscribers currently registered in the VLR service area. This information may include an International Mobile Station Identifier (IMSI), a Temporary IMSI (TIMSI), a Mobile Subscriber ISDN (MSISDN) identifier, a Mobile Identification Number (MIN), Electronic Serial Number (ESN), or an IP address identifier. Mobile subscriber handset media capability information may also be provided, if available.

In one embodiment of the PPG—VLR query/response method, a PPG node may formulate a query message requesting routing information associated with all mobile subscribers currently being served by a VLR node and communicate the query request to the VLR node via an IP communication link.

The VLR may receive the PPG subscriber query message and formulate a response message, which contains the necessary subscriber identifier and routing address information. The VLR may provide mobile subscriber identifier/ routing address information for all subscribers currently being served by the VLR, or alternatively, a subset of all subscribers currently being served. For example, in one embodiment, a PPG node may include in a VLR query message a class of service threshold value. Subscriber subsets may include only those subscribers that are designated within the VLR subscriber database as having a class of service that is at or above the specified threshold value. The PPG query message may include an identifier, such as a home location register (HLR) identifier, such that a VLR may provide in the response message only those mobile subscribers that are based in the geographic region served by the specified HLR ID.

The PPG may query the VLR by establishing a MAP dialogue with the VLR over the B interface, which is normally used for communications between the MSC and the VLR. The PPG may then obtain the target audience identification information using procedures similar the SEND_INFO_FOR_MT_SMS service defined in the GSM mobile application part (MAP) specification available from the European Telecommunications Standards Institute as standard number GSM 09.02, version 7.15.0, the disclosure of which is incorporated herein by reference in its entirety. The SEND_INFO_FOR_MT_SMS is used to obtain subscriber information from a VLR for delivering a short message to a subscriber registered in the VLR. However, rather than requesting contact information for a specific mobile subscriber, the PPG may request contact information regarding all or a subset of mobile subscribers in a VLR's service area. Such a request may require modification to current MAP procedures between the VLR and the MSC to allow the VLR to process the contact information request. For example, the VLR may be configured to recognize wildcard or partial IMSIs in the SM-RP-DA fields in order to send contact information to the PPG for multiple subscribers. Alternatively, the PPG may be co-located with the VLR. In such an instance, the PPG may simply access the VLR's subscriber registration database and obtain the contact information directly without any external messaging.

In any event, a PPG node may receive subscriber ID and routing information for some or all of the subscribers being served by a VLR node. PPG 228 may use the mobile subscriber information returned by the VLR, in conjunction with the commercial content message received from ARS 212, to generate multiple commercial content messages that are distributed to a target audience of mobile subscribers. PPG 228 may generate a commercial content message for each subscriber being served by the queried VLR node, or the PPG may apply one or more target audience discrimination criteria to the list of mobile subscribers returned by a queried VLR node. Exemplary target audience discrimination criteria may include geographic location type identifiers, such as a SID, BID, cell ID, or other similar identifiers. Target audience discrimination criteria may also include a class of service parameter, a network operator identifier, or a home service location identifier (e.g., HLR ID). By applying one or more target audience discriminators, PPG 228 may narrow the group of mobile subscribers to which a commercial content message is to be delivered.

In summary, in one embodiment of the present invention, a queried VLR node may respond to the querying PPG node with a complete list of all currently served mobile subscribers, or the VLR may provide a narrowed list of mobile subscribers based on one or more target audience discriminators contained in the PPG query. In the former case, a PPG node may receive the complete list of all currently served mobile subscribers from the queried VLR and apply one or more target audience discriminators to narrow the group of mobile subscribers to which a commercial content message is to be delivered. In the latter case, the PPG node may simply deliver the commercial content to all of the nodes in the narrowed list received from the VLR.

Once a list of targeted mobile subscribers is determined, the communication device capabilities of each targeted mobile subscriber are determined using any one of a number of WAP procedures, including querying of WAP User Agent Profile (UAP) or Composite Capability/Preference Profile (CC/PP) information from a CC/PP server. UAP and CC/PP specifications define a set of components and attributes that WAP-enabled devices may convey to PPG and other agents in a WAP network structure. These capability attributes may include hardware characteristics (screen size, color capabilities, image capabilities, manufacturer, etc.), software characteristics (operating system vendor and version, support for MExE, list of audio and video encoders, etc.), application/user preferences (browser manufacturer and version, markup languages and versions supported, scripting languages supported, etc.), WAP characteristics (WML Script libraries, WAP version, WML deck size, etc.), and network characteristics (bearer characteristics such as latency and reliability, etc.). Alternatively, a PPG node may contact a targeted communication device and negotiate media capabilities at the time of commercial content message delivery. In any event, a PPG node may retain or cache device capability information for use in subsequent commercial content message delivery attempts.

Once the capabilities of a targeted mobile communication device have been determined, a PPG node of the present invention may also customize commercial content for a device based on its media and resource capabilities. For example, a targeted mobile device may indicate that it is only capable of displaying GIF images, while the commercial content message received by a serving PPG node contains a commercial content that includes a JPEG formatted image. Instead of aborting the delivery, the PPG node may chose to convert the GIF image to a JPEG formatted image for delivery to the JPEG capable mobile device.

Pushed commercial content may be directed towards a specific user agent (or more general, a specific application) on a targeted mobile subscriber's communication device. In one embodiment, an application identifier, which may include a Uniform Resource Identifier (URI) or a numeric value registered with the WAP Interim Naming Authority (WINA), is used to identify a user agent or application. The user agent or application identifier may be included as an X-WAP-Application-Id in a header within a commercial content message. The application identifier is conveyed to the target mobile subscriber communication device when a PPG delivers the message, allowing the receiving device to dispatch the message to the intended user agent. As such, WAP may be used as the transport mechanism for commercial content that is intended for any number or types of applications (e.g., WEB browser, media player, audio player, graphics viewer, etc.) installed on a targeted mobile device.

Example Commercial Content Message Distribution

Figure 5:
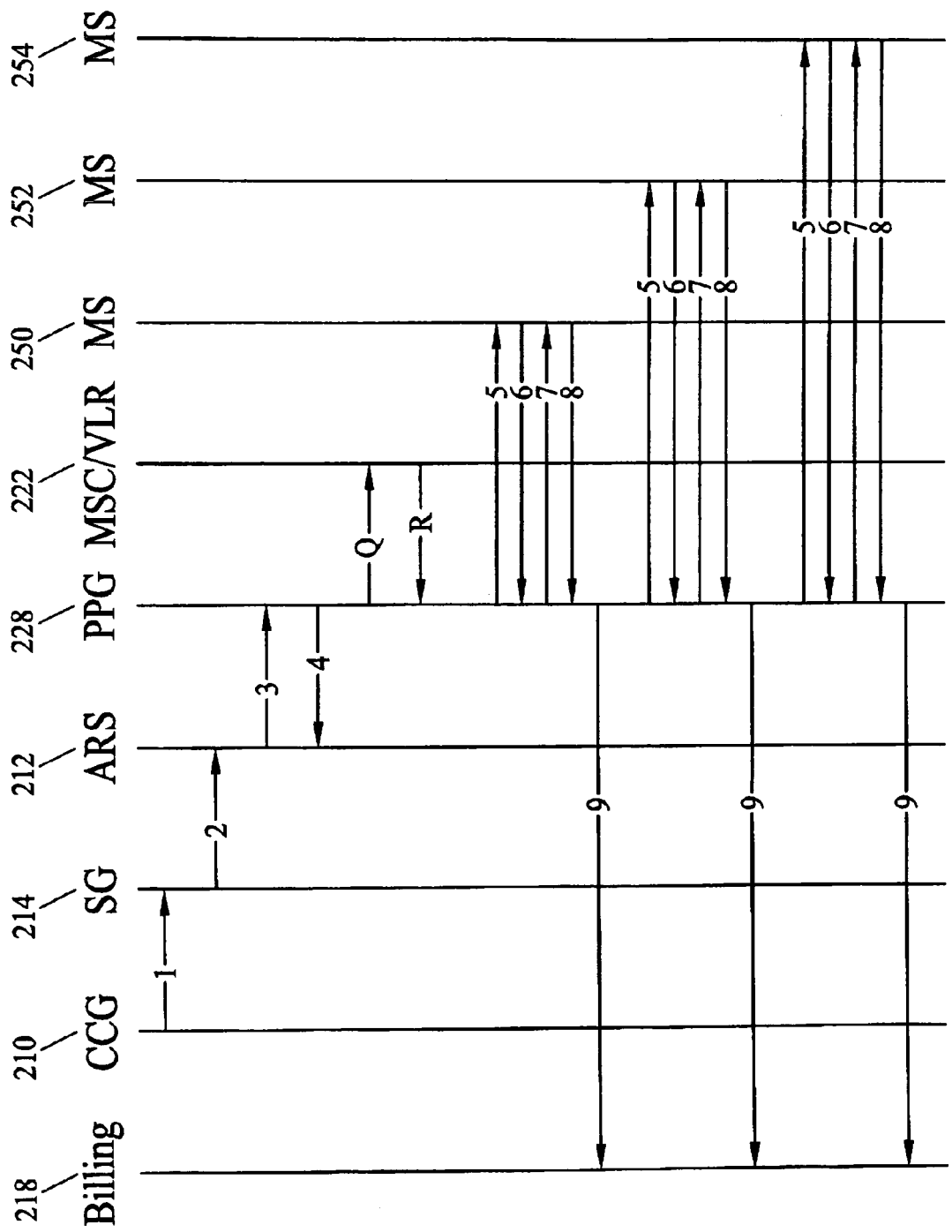
FIG. 5 is a message flow diagram depicting exemplary messaging interactions among several functional components of a commercial content distribution system according to an embodiment of the present invention.

FIG. 5 is a message flow diagram associated with the exemplary commercial content messaging system shown in FIG. 4 and described in detail above. In this example, message 1 includes a unique transaction identifier and a WML/XML-formatted component, which is generated by CCG 210 and transmitted to SG 214. At SG 214, security and firewall policies are applied. If the message satisfies the SG security criteria, the commercial content message is directed from SG 214 to PPG ARS server 212 as indicated by message 2. An optional acknowledgement message may be generated by ARS 212 and returned to CCG 210. This acknowledgement message may include a WAP push response message that contains the unique transaction ID and a timestamp as to when the message was created. ARS 212 may examine one or more target audience identifiers in the CCG-generated message. In this example, the target audience is a geographic location based on the area code 617. The area code prefix identifier 617 is resolved into the IP address (i.e., 100.100.25.67 from Table 3 above) of the push proxy gateway 228 that serves the MSC 222 associated with that Boston area code. A message header is formatted, and a WAP message is sent to PPG 228, as indicated by message 3 in FIG. 5. PPG 228 responds to receipt of WAP commercial content message 3 with WAP acknowledgement message 4. In this example, PPG 228 examines information in the commercial content message including, target audience information, distribution or delivery start and end date/time information, notification/billing service URL information, message treatment information, class of service information, as well as the actual commercial content and content characteristics.

PPG 228 may then query MSC-VLR 222 to obtain a list of mobile subscribers in the service area of MSC-VLR 222. As described in detail above, when queried by PPG 228, MSC-VLR 222 may respond with a list of only targeted mobile subscribers or with a list of all mobile subscribers in the service area. In the latter case, PPG 228 may further screen the list of mobile subscribers provided by the MSC-VLR 222 in order to obtain a list of target mobile subscribers. Also, as described above, PPG 228 may have previously cached mobile subscriber data that was obtained from MSC-VLR node 222. In this case PPG 228 may simply use the cached mobile subscriber information instead of querying the MSC-VLR node.

Once a list of targeted mobile subscribers has been compiled by PPG 228, PPG 228 may initiate (or attempt to initiate) a communication with each mobile subscriber on the target audience list using mobile subscriber identification information (e.g., IMSI, MSISDN, IP address, etc.) provided by MSC-VLR 222. Depending on the type of notification requested by CCG 210, the commercial content message delivery process can be accomplished via a connectionless or a connection-oriented push. If a connectionless service is requested, PPG 228 may initiate a connectionless push request containing the session initiation application (SIA) content type. This content identifies PPG 228 with which the targeted mobile client should establish a session and also the bearer network that the targeted mobile client should use. In the example shown in FIG. 5, this information is communicated as message 5 to each of three target mobile subscribers (MS): MS 250, MS 252, and MS 254.

Upon receipt of message 5, each targeted mobile subscriber handset invokes the requested SIA and establishes a session to PPG 228 using the indicated bearer network. Each targeted mobile device responds to the connection request with an acknowledgement/response message 6, thereby allowing the delivery of the commercial content. Next, the commercial content is pushed down to each targeted mobile subscriber's handset via message 7. Each handset acknowledges receipt of the commercial content and notifies the PPG that content has arrived and that the connection is now closed via message 8. With message 9, PPG 228 sends a "successful" delivery notification to the notification/billing URL associated with billing server 218 that was included in the original commercial content message header by CCG 210. The measurements billing report may indicate that the commercial was successfully delivered to the IMSIs (or MSISDNs, IP addresses, etc.) associated with the targeted mobile subscribers 250, 252, and 254. Message 9 may also be sent to CCG 210 to confirm delivery of the commercial content to the targeted subscribers.

Because all of the messages associated with the commercial content delivery preferably reference the unique transaction ID initially created by CCG 210, the commercial content distribution system of the present invention is able to reference any push content that is active in the system. This allows CCG 210 or ARS 212 to issue a WAP push cancellation command, a WAP push replacement command, a status query, or a client capabilities query associated with any active push transaction in the system.

Centralized PPG Embodiment

Figure 6:
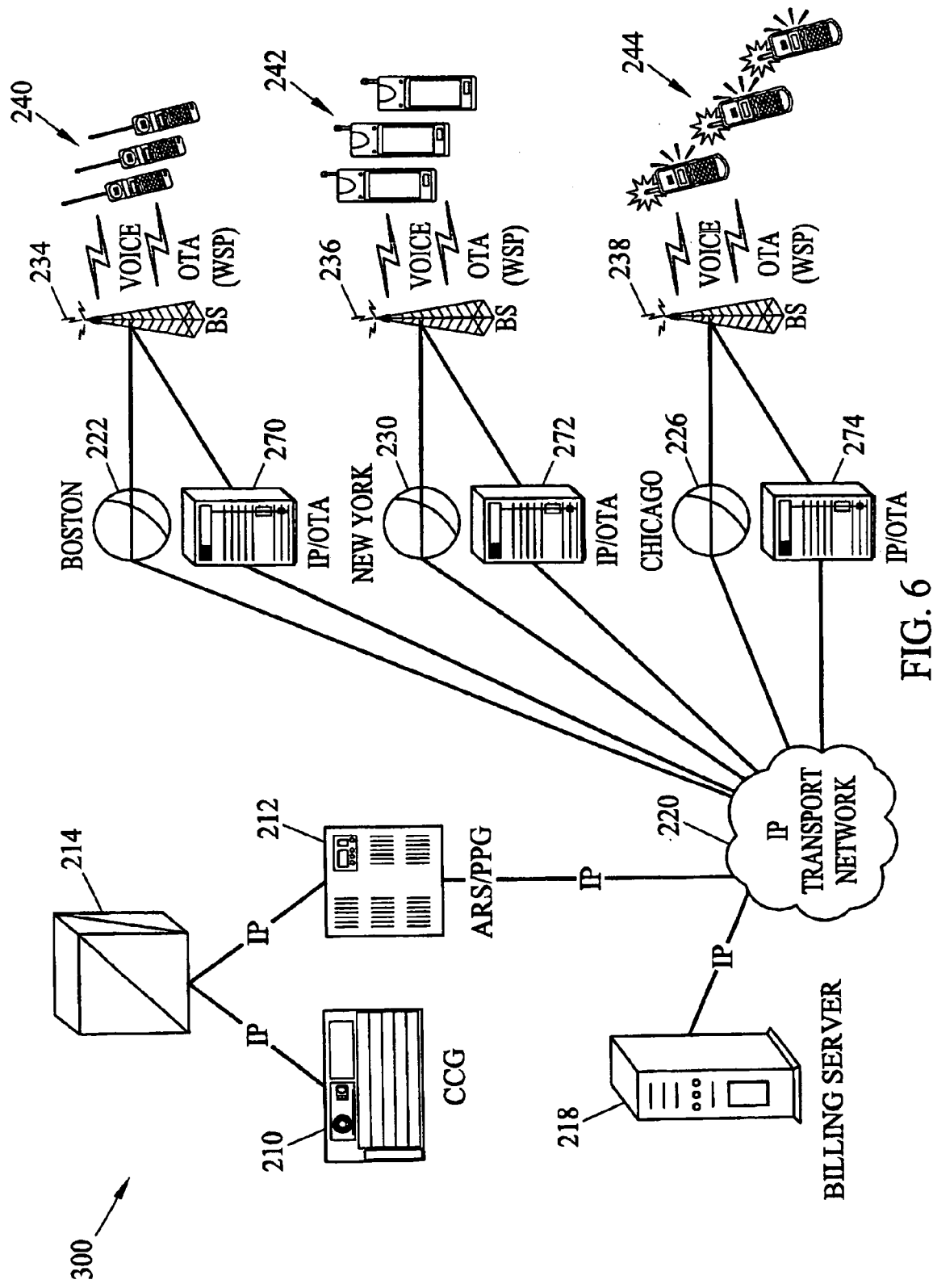
FIG. 6 is a network diagram illustrating exemplary components of a commercial content distribution system according to an alternate embodiment of the present invention.

FIG. 6 illustrates an alternate embodiment of the present invention that incorporates ARS and PPG functionality, as described above, into a single functional entity. From a practical standpoint, the embodiment presented in FIG. 6 provides similar overall functionality when compared to the previous embodiment. In the exemplary network 300, PPG functionality has been centralized and combined with the ARS functionality, so as to form a PPG/ARS node 260. Such a system architecture eliminates the need to co-locate a PPG node at an MSC-VLR node. As such, PPG functionality now resides at a centralized location, where multiple (if not all) of the MSC-VLRs in an operator's network may be accessed by a single PPG/ARS node. In this case, the ARS/PPG entity may receive a commercial content message that includes a target audience identifier and determine to which MSC-VLR service areas will be involved in the distribution of the commercial content. The ARS/PPG node 260 may query each relevant MSC-VLR entity in order to obtain the necessary mobile subscriber information. Once this information is obtained, it is used to distribute commercial content messages to individual mobile subscribers using, for example, the WAP protocol. Mobile subscriber information may be cached, as described above, to improve overall system performance. In certain network scenarios, this centralized PPG/ARS architecture may provide for a more efficient and economical deployment of commercial content messaging according to the present invention.

With this deployment or architecture, a device for translating IP protocol data units (PDUs) to an OTA format is required. Such IP/OTA translators are illustrated in FIG. 6 as nodes 270, 272, and 274, serving Boston, New York, and Chicago, respectively. In the previous embodiment, this functionality was previously incorporated within each serving PPG node. In all other respects, commercial content messaging in this embodiment is similar to that described with respect to the previous embodiment.

As described above with respect to the various embodiments, the present invention includes methods and systems for generating and distributing commercial content to a plurality of subscribers associated with different end office facilities. While the examples described above relate to delivering commercial content to mobile subscribers, targeted commercial content recipients may be landline telecommunications network subscribers, mobile telecommunications network subscribers, or both. The invention also includes methods for screening and generating billing records for commercial content generation and distribution. The screening and billing operations may be performed at an SS7 signal transfer point or SG node. Thus, the invention creates revenue potential for telecommunications network operators.

With regard to this potential revenue generation, the present invention includes a new business method associated with the distribution of commercial content to telecommunications service subscribers. According to the method, the owner of a commercial content generator, SG node, and/or commercial content address resolver/distributor may sell advertising space to a business, such as a retail establishment. The owner may determine the commercial content desired to be distributed and the intended recipients and enter this information into the commercial generator. The CCG, the SG, and the ARS may then deliver the message to the end offices associated with the intended recipients. The CCG, SG, ARS, or PPG nodes may also generate a billing record indicating the time and content delivered to the recipients. A bill may then be generated and sent to the retail establishment.

In another business method, a mobile service provider may enter an agreement with a service provider where the mobile service provider provides free or discounted usage of mobile services, such as free or discounted airtime minutes, for subscribers who view specific advertisements or a predetermined volume of advertisements via their mobile communications devices. The advertiser will then pay the mobile service provider for the advertising and the airtime. The viewing of the advertisement may be tracked by the PPGs. Once a mobile subscriber views a predetermined advertisement, the subscriber's handset may send a message to the serving PPG indicating that the ad or ads have been viewed. The PPG may inform the billing server or the CCG that the ad has been viewed. The billing server may automatically generate a credit that appears on the subscriber's bill.

Although in the examples described above, the CCG requests delivery of commercial content and the commercial content is immediately delivered to the target subscribers, the present invention is not limited to immediate delivery. For example, the CCG may allow an advertiser to schedule both delayed and sequential deliveries. For delayed delivery, an advertiser may desire to schedule a delivery regarding a future sale or event. The advertiser may contact the owner of the CCG, pay for the advertising, and schedule the delivery. The CCG may store the content and trigger delivery at the time requested by the advertiser. For sequential or associated delivery, an advertiser may request delivery of follow-up ads to subscribers. The mobile handsets may track ads viewed by particular subscribers and send viewing acknowledgement messages to the PPG when the subscriber views a particular ad. When the PPG detects that a subscriber has viewed an ad, if the PPG has stored content from the CCG relating to the same ad, the PPG may deliver the stored content to the subscriber. If the PPG does not have stored content, the PPG may either discard the viewing acknowledgment message received from the handset or may deliver the acknowledgment to the CCG and/or the billing server. In response to the viewing acknowledgement message, the CCG may then deliver related content to the subscriber. If a credit mechanism is in place, the billing server may credit the subscriber's account, as described above.

In some of the examples described above, the message sent by the CCG to the PPGs to request delivery of commercial content contains the actual content to be delivered. However, the present invention is not limited to such an implementation. In an alternate implementation, the CCG may first send a request message to the PPGs requesting delivery of commercial content. After receiving a positive acknowledgement to the request, the CCG may send a subsequent message or messages containing the commercial content.

In order to enhance security, it may be desirable to use an authentication mechanism between the CCG and the ARS and/or between the ARS and the PPGs. For example, in order to prevent CCG masquerading, a public key cryptosystem may be used between the CCG and the ARS. The CCG may sign the commercial content generation with a private encryption key known only to the CCG. The ARS may use the CCG's public key to decode the message. If the message that is decoded is a validly formatted commercial content message, the ARS may determine that the CCG is authentic.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for generating and distributing commercial content messages to communications network subscribers, the method comprising:
    (a) generating a message including commercial content and target subscriber audience identification information for identifying a target subscriber audience including a plurality of communications network subscribers;
    (b) resolving, using a push proxy gateway address resolution database that maps target audience identifiers to serving push proxy gateway addresses, the target subscriber audience identification information into address information associated with at least one push proxy gateway from a plurality of push proxy gateways associated with different target audiences for delivering the commercial content to the target subscriber audience;
    (c) routing the message to the at least one push proxy gateway;
    (d) obtaining individual target subscriber contact information for subscribers in the target audience; and
    (e) delivering the commercial content from the at least one push proxy gateway to subscribers in the target audience using the individual target subscriber contact information.

2. The method of claim 1 wherein the commercial content includes at least one of video information, graphics information, audio information, and text information.

3. The method of claim 1 wherein the commercial content includes an electronic coupon.

4. The method of claim 1 wherein the plurality of communications network subscribers includes subscribers associated with different switching offices and wherein resolving the target subscriber audience identification information into address information includes resolving the target subscriber audience identification information into addresses for push proxy gateways associated with the different switching offices.

5. The method of claim 4 wherein the switching offices include mobile switching centers.

6. The method of claim 4 wherein the switching offices include landline end offices.

7. The method of claim 1 wherein the target subscriber audience identification information includes a geographic location identifier.

8. The method of claim 7 where the geographic location identifier includes a telecommunications area code identifier.

9. The method of claim 7 where the geographic location identifier includes a mobile switching center identifier.

10. The method of claim 7 where the geographic location identifier includes a cell identifier.

11. The method of claim 7 wherein the geographic location identifier includes a city identifier.

12. The method of claim 1 wherein the target subscriber audience identification information includes a class of service identifier.

13. The method of claim 1 including performing security screening on the message prior to routing the message to the at least one push proxy gateway.

14. The method of claim 13 wherein performing security screening includes verifying that the message was sent by an authorized commercial content message source.

15. The method of claim 13 including discarding the message in response to the determining that the message fails to pass security screening.

16. The method of claim 13 wherein performing security screening on the message prior to routing the message to the at least one push proxy gateway includes performing the security screening at a signal transfer point.

17. The method of claim 1 wherein obtaining individual target subscriber contact information includes querying a visitor location register (VLR).

18. The method of claim 1 wherein obtaining individual target subscriber contact information includes obtaining international mobile station identifiers (IMSIs) from a location register.

19. The method of claim 1 wherein obtaining individual target subscriber contact information includes obtaining a list of mobile identification numbers (MINs) from a location register.

20. The method of claim 1 wherein obtaining individual target subscriber contact information includes obtaining a list of mobile subscriber Internet protocol (IP) addresses from a location register.

21. The method of claim 1 wherein obtaining individual target subscriber contact information includes querying a location register, and, at the location register, identifying members of the target subscriber audience to receive the commercial content based on the query.

22. The method of claim 1 wherein obtaining individual target subscriber contact information includes querying a location register for the contact information, receiving contact information from the location register for a first group of subscribers having contact information stored in the location register, and selecting subscribers from the first group to receive the commercial content based on predetermined criteria.

23. The method of claim 22 wherein selecting subscribers to receive the commercial content based on predetermined criteria includes excluding subscribers who pay not to receive commercial content from receiving the commercial content.

24. The method of claim 22 wherein selecting subscribers to receive the commercial content based on predetermined criteria includes selecting subscribers who pay for commercial content to receive the commercial content.

25. The method of claim 1 wherein delivering the commercial content to communication service subscribers includes using the wireless application protocol (WAP) to deliver the commercial content.

26. The method of claim 1 comprising, at a mobile subscriber communication device, receiving the commercial content and determining whether to display the commercial content based on a class of service associated with the content.

27. The method of claim 1 comprising, at the at least one push proxy gateway, determining whether to deliver the commercial content to a subscriber based on a class of service associated with the subscriber.

28. The method of claim 1 comprising generating a billing message, the billing message indicating that a communication subscriber has received the commercial content.

29. The method of claim 28 wherein generating a billing message includes generating the billing message at a subscriber's communication device.

30. A method for doing business comprising:
 (a) charging a fee to a party seeking to distribute commercial content to the plurality of communications network subscribers;
 (b) in return for the fee, distributing the commercial content to the plurality of communications network subscribers using the steps of claim 1.

31. The method of claim 1 comprising, receiving confirmation that a communications network subscriber has viewed the commercial content, and, in response to the confirmation, crediting a communications services account of the subscriber with a predetermined credit.

32. The method of claim 1 comprising receiving instructions for delivery of commercial content to the target subscriber audience at a predetermined future time and wherein delivering the commercial content to members of the target subscriber audience includes delivering the commercial content to the target subscriber audience at the predetermined future time.

33. The method of claim 1 comprising receiving confirmation that a communications network subscriber has viewed the commercial content and, in response to the confirmation, delivering related commercial content to the communications network subscriber.

34. A system for generating and distributing commercial content messages to communications network subscribers, the system comprising:
 (a) a commercial content generator for creating a message that includes commercial content and target subscriber audience identification information for identifying a target subscriber audience associated with a plurality of communications network subscribers;
 (b) an address resolution server (ARS) including a push proxy gateway address resolution database that maps target audience identifiers to serving push proxy gateway addresses, the address resolution server for resolving, using the push proxy gateway address resolution database, the target subscriber audience identification information into address information associated with at least one push proxy gateway from a plurality of push proxy gateways associated with different target audiences; and
 (c) a push proxy gateway associated with the address resolution server for receiving the message, for obtaining individual target subscriber contact information, and for delivering the commercial content to subscribers in the target audience using the individual target subscriber contact information.

35. The system of claim 34 wherein the commercial content includes at least one of audio, video, graphics, and text information.

36. The system of claim 34 wherein the commercial content includes an electronic coupon.

37. The system of claim 34 wherein the plurality of communications network subscribers includes subscribers associated with different switching offices and wherein resolving the target subscriber audience identification information into address information includes resolving the target subscriber audience identification information into addresses for push proxy gateways associated with the different switching offices.

38. The system of claim 37 wherein the switching offices include mobile switching centers.

39. The system of claim 37 wherein the switching offices include land line end offices.

40. The system of claim 34 wherein the target subscriber audience identification information includes a geographic location identifier.

41. The system of claim 40 wherein the geographic location identifier includes a telecommunications area code identifier.

42. The system of claim 40 wherein the geographic location identifier includes a mobile switching center identifier.

43. The system of claim 40 wherein the geographic identifier includes a city identifier.

44. The system of claim 40 wherein the geographic location identifier includes a cell identifier.

45. The system of claim 34 wherein the target subscriber audience identification information includes a class of service identifier.

46. The system of claim 34 wherein the push proxy gateway is adapted to query a VLR to obtain the individual target subscriber contact information.

47. The system of claim 34 wherein the individual target subscriber contact information includes international mobile station identifiers (IMSIs) for the target subscribers.

48. The system of claim 34 wherein the individual target subscriber contact information includes mobile identification numbers (MINs) for the target subscribers.

49. The system of claim 34 wherein the individual target subscriber contact information includes IP addresses for the target subscribers.

50. The system of claim 34 including a security screening function operatively associated with the push proxy gateway for screening the message to determine whether delivery of the commercial content is authorized.

51. The system of claim 50 comprising a signaling message routing node, wherein the security screening function is located on the signaling message routing node.

52. The system of claim 50 wherein the security screening function is located on the address resolution server.

53. The system of claim 34 including an accounting function operatively associated with the push proxy gateway for billing a commercial content provider for delivering the commercial content.

54. The system of claim 34 comprising a signal transfer point for receiving the message from the commercial content generator and for screening the message to determine whether to deliver the message to the address resolution server.

55. A computer program product comprising computer-executable instructions embodied in a computer-readable medium for performing steps comprising:

(a) generating a message including commercial content and target subscriber audience identification information for identifying a target subscriber audience including a plurality of communications network subscribers, at least some of the plurality of communications network subscribers being associated with different switching offices;

(b) resolving, using a push proxy gateway address resolution database that maps target audience identifiers to serving push proxy gateway addresses, the target subscriber audience identification information into address information associated with at least one push proxy gateway from a plurality of push proxy gateways associated with different target audiences for delivering the commercial content to the target subscriber audience;

(c) routing the message to the at least one push proxy gateway;

(d) obtaining individual target subscriber contact information for subscribers in the target audience; and (e) delivering the commercial content from the at least one push proxy gateway to subscribers in the target audience using the individual target subscriber contact information.

56. The computer program product of claim 55 comprising performing security screening on the message at a signal transfer point prior to routing the message to the push proxy gateway.

* * * * *